UNITED STATES PATENT OFFICE.

HENRY OHLSEN AND JOHN OHLSEN, OF LOUP CITY, NEBRASKA.

BRICK-GLAZING COMPOUND.

No. 921,879.     Specification of Letters Patent.     Patented May 18, 1909.

Application filed February 17, 1908. Serial No. 416,383.

*To all whom it may concern:*

Be it known that we, HENRY OHLSEN and JOHN OHLSEN, citizens of the United States, residing at Loup City, in the county of Sherman and State of Nebraska, have invented certain new and useful Improvements in Brick-Glazing Compounds; and we do declare the following to be a full, clear, and exact description of the invention, such as will enable others skilled in the art to which it appertains to make and use the same.

This invention relates to an improved glazing composition for bricks, and the object of the invention is to provide a compound of this class which is applicable to bricks or other articles either green or burned, and which is cheap to manufacture and produces a fine quality glazed finish.

This composition is composed of two main ingredients to which various other ingredients may be added to produce different coloring effects and different properties. The main ingredient of the different glazes is lead pigment such as is used in paints, either red or white according to the color desired combined with fine screen muddy clay water, shale clay or porcelain clay water. The muddy clay water is produced by mixing pure dry clay dust with water in about the following proportions: from 5 to 10 tablespoonfuls of pure dry clay dust with 1 pint of water, the dust being mixed and held in suspension in the water, produces the muddy clay water.

To produce a fine red glaze, the following ingredients are commingled: 1 part pure red lead pigment; 1 part brandy; 2 parts muddy clay water.

Another glaze is composed of 1 part lead pigment; 1 part urine; 2 parts muddy clay water.

For a black glaze, the following ingredients are mixed: 1 part lead pigment; 1 part shale water; 1 part soot (preferably taken from a boiler) and 1 part alcohol, or liquor of any kind.

For a green gray glaze, the mixture is composed of 1 part lead pigment; 1 part muddy clay water; 1 part blue vitriol water; 1 part urine; 1 part air-slaked lime.

It has also been found that a mixture of lead pigment and flour produces a good glaze, mixed in the following proportions: 1 part lead pigment, and 1 part flour mixed to a thin fluid.

The brick before the glaze is applied, is preferably dipped in flour paste or blood water to obtain an even glazing of the brick.

The glaze may be applied to green clay bricks and then burned; or to burned bricks and then burned again, or the glazed bricks may be again burned with equally good results. Various coloring ingredients may be added to the different glazes to produce different colors.

The lead above described is pure red and white lead pigment such as is used in the manufacture of paints, and the clay water mixed with the lead is first screened or strained through a suitable cloth to remove all of the sand or impurities, and this pure strained water is then mixed with the lead to form a thin fluid into which the face of the bricks is dipped. This fluid is allowed to dry on the face of the bricks and they are then placed in a kiln and burned, which causes the lead and clay water to melt on the face of the brick and form a glaze. If the clay burns white the glaze will be light, and if it burns red the color in the glaze will be red, a yellow color will be obtained if the clay burns yellow and brandy or other alcoholic liquor is added to the mixture to give the glaze a bright shining appearance. The soot is obtained from boiler tubes and is especially adapted for applicants' purpose, as it is a cheap ingredient and produces a fine black glaze. The air slaked lime combined with the other ingredients produces a green gray metallic glaze.

Having thus fully described our invention, what we claim as new, and desire to secure by Letters-Patent, is.

1. A glazing composition comprising lead pigment mixed with muddy clay water and an alcoholic liquor.

2. A glazing composition comprising lead pigment mixed with clay water and an alcoholic liquor, and a coloring ingredient commingled therewith.

3. A glazing composition composed of one part lead pigment, one part brandy and one part muddy clay water.

4. A glazing composition comprising one part lead pigment, one part muddy clay water, one part blue vitriol water, one part air-slaked lime and one part alcoholic liquor.

In testimony whereof we have hereunto set our hands in presence of two subscribing witnesses.

HENRY OHLSEN.
JOHN OHLSEN.

Witnesses:
W. F. MASON,
F. B. PAIST.